United States Patent
Cui et al.

(10) Patent No.: US 12,205,762 B2
(45) Date of Patent: Jan. 21, 2025

(54) FEEDSTOCK AND HETEROGENEOUS STRUCTURE FOR TOUGH RARE EARTH PERMANENT MAGNETS AND PRODUCTION THEREFOR

(71) Applicant: Iowa State University Research Foundation, Inc., Ames, IA (US)

(72) Inventors: Jun Cui, Ames, IA (US); Baozhi Cui, Ames, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 392 days.

(21) Appl. No.: 16/350,215

(22) Filed: Oct. 15, 2018

(65) Prior Publication Data
US 2019/0115128 A1   Apr. 18, 2019

Related U.S. Application Data

(60) Provisional application No. 62/707,013, filed on Oct. 16, 2017.

(51) Int. Cl.
*H01F 1/153* (2006.01)
*B22F 1/05* (2022.01)
(Continued)

(52) U.S. Cl.
CPC ............ *H01F 41/0266* (2013.01); *B22F 1/05* (2022.01); *B22F 1/052* (2022.01); *B22F 9/04* (2013.01); *H01F 1/0551* (2013.01); *H01F 1/0555* (2013.01); *H01F 1/0557* (2013.01); *H01F 1/0577* (2013.01); *H01F 1/058* (2013.01); *H01F 1/059* (2013.01); *H01F 1/15325* (2013.01); *B22F 1/054* (2022.01); *B22F 3/14* (2013.01); *B22F 3/18* (2013.01); *B22F 3/20* (2013.01); *B22F 2009/044* (2013.01);
(Continued)

(58) Field of Classification Search
None
See application file for complete search history.

(56) References Cited

U.S. PATENT DOCUMENTS 3,677,947 A * 7/1972 Ray ............................ H01F 1/06
                                                      252/62.51 R
2015/0235747 A1* 8/2015 Miyamoto ............... C22C 28/00
                                                      419/27
(Continued)

FOREIGN PATENT DOCUMENTS

JP           02020002 A  * 1/1990

OTHER PUBLICATIONS

Machine translation of JP02-020002A. (Year: 1990).*
(Continued)

*Primary Examiner* — Xiaowei Su

(57) ABSTRACT

New types of particle feedstocks and heterogeneous grain structures are provided for rare earth permanent magnets (REPMs) and their production in a manner to significantly enhance toughness of the magnet with little or no sacrifice in the hard magnetic properties. The novel tough REPMs made from the feedstock have heterogeneous grain structures, such as bi-modal, tri-modal, multi-modal, laminated, gridded, gradient fine/coarse grain structures, or other microstructural heterogeneity and configurations, without changing the chemical compositions of magnets.

7 Claims, 14 Drawing Sheets

(51) Int. Cl.
- *B22F 1/052* (2022.01)
- *B22F 9/04* (2006.01)
- *H01F 1/055* (2006.01)
- *H01F 1/057* (2006.01)
- *H01F 1/058* (2006.01)
- *H01F 1/059* (2006.01)
- *H01F 41/02* (2006.01)
- *B22F 1/054* (2022.01)
- *B22F 3/14* (2006.01)
- *B22F 3/18* (2006.01)
- *B22F 3/20* (2006.01)
- *B33Y 10/00* (2015.01)
- *C22C 19/07* (2006.01)
- *C22C 38/00* (2006.01)
- *H01F 1/08* (2006.01)

(52) U.S. Cl.
CPC ... *B22F 2301/155* (2013.01); *B22F 2301/355* (2013.01); *B22F 2304/10* (2013.01); *B22F 2999/00* (2013.01); *B33Y 10/00* (2014.12); *C22C 19/07* (2013.01); *C22C 38/005* (2013.01); *C22C 2202/02* (2013.01); *H01F 1/086* (2013.01)

(56) References Cited

U.S. PATENT DOCUMENTS

2015/0239048 A1* 8/2015 Nagata .................. H01F 1/0571 419/23
2015/0243433 A1* 8/2015 Sun ...................... H01F 41/0273 148/102
2018/0166190 A1* 6/2018 Turgut ................... C22C 38/00

OTHER PUBLICATIONS

Singh (J. Magnetism and Magnetic Materials, vol. 379, p. 300-304, 2015). (Year: 2015).*
E.P. Wohlfarth et al., Handbook of Magnetic Materials, Elsevier vol. 4, Chap.1 pp. 70-106 and Chap 2, pp. 142-185, 1988.
www.electronenergy.com, Neodymium Iron Boron Magnets 2017 OPAR.

* cited by examiner

FEEDSTOCK AND HETEROGENEOUS STRUCTURE FOR TOUGH RARE EARTH PERMANENT MAGNETS AND PRODUCTION THEREFOR

RELATED APPLICATION

This application claims benefit and priority of provisional application Ser. No. 62/707,013 filed Oct. 16, 2017, the disclosure and drawings of which are incorporated herein by reference.

CONTRACTUAL ORIGIN OF THE INVENTION

This invention was made with government support under Contract No. DE-AC02-07CH11358 awarded by the U.S. Department of Energy. The government has certain rights in the invention.

FIELD OF THE INVENTION

The present invention relates generally to particle feedstocks and to rare earth permanent magnets (REPMs) made using the feedstocks with a beneficial heterogeneous grain structure as well as to magnet production methods. More particularly, the invention relates to particle feedstocks for making REPM's with a heterogeneous grain structure that significantly enhances mechanical properties, such as toughness and/or strength, of the magnet with little or no sacrifice in hard magnetic properties.

BACKGROUND OF THE INVENTION

Rare-earth permanent magnets (REPMs) mainly include samarium-cobalt type ($SmCo_5$ and $Sm_2Co_{17}$ types) magnets, neodymium-iron-boron type ($Nd_2Fe_{14}B$ type) magnets, a neodymium-iron-carbon type magnet ($R_2Fe_{14}C$ type, R=rare earth, La or yttrium), a R-iron-nitrogen type magnet ($R_2Fe_{17}X_\delta$, R=rare earth, La or Y; X=H, C, and/or N), or a, R-iron-M-nitrogen type magnet ($R(Fe, M)_{12}X_\delta$ type, R=rare earth, La or Y; M=Mo, V, Ti, Si, Al, Cr, Cu, Ga, Ge, Mn, Nb, Sn, Ta, W or Fe; X=H, C, and/or N), and some other stable or metastable rare-earth-transition metal based magnetic compounds. Sm—Co and Nd—Fe—B based sintered magnets are the most common commercial REPMs. REPMs have excellent hard magnetic properties, such as high magnetocrystalline anisotropy field $H_A$, high intrinsic coercivity $H_{ci}$, high or moderate high saturation magnetization $4\pi M_s$, high remanence $B_r$, high Curie temperatures $T_C$, and high maximum energy product $(BH)_{max}$. For example, the commercial available Nd—Fe—B sintered magnets have an $H_A$ about 67 kOe, $H_{ci}$ about 11-30 kOe, $4\pi M_s$ about 13-16 kGs, $B_r$ about 11.6-14.4 kGs, $T_C$ about 310-400° C., $(BH)_{max}$ up to 30-52 MGOe, reversible temperature coefficient (RTC) of $B_r$ calculated between 20 and 100° C. about −0.11, maximum operation temperature up to about 70-200° C., respectively. The commercially available $SmCo_5$ (1:5) and $Sm(Co, Fe, Cu, Zr)_z$ (2:17) type sintered magnets (two families of Sm—Co magnets) have an $H_A$ about 400 kOe and 65 kOe, $H_{ci}$ about 16-40 kOe, $4\pi M_s$ about 11-13 kGs, $B_r$ about 8.5-11.7 kGs, $T_0$ about 681° C. and 850° C., $(BH)_{max}$ up to 24-35 MGOe, RTC of $B_r$ about −0.035 to −0.04, maximum operation temperature up to 300-550° C., respectively.

REPMs have been widely used in telecommunication, consumer electronics, magnetic storage, magnetic resonance imaging (MRI), sensors, and power and propulsion applications such as high performance motors and generators, wind turbine system, maglev train, ion engine and other high g-force applications, and many other applications. Nd—Fe—B magnets exhibit the highest room temperature magnetic properties while Sm—Co magnets are the ultimate choice for high speed (30,000 to 100,000 rpm) motor applications, inertial devices such as gyroscopes and accelerometers, and traveling wave tubes due to their excellent hard magnetic properties and thermal stability at elevated temperatures in the range of 200-550° C.

However, REPMs have a high-risk of mechanical failure when subjected to mechanical stress such as vibration and mechanical shock since the intermetallic compounds of $Nd_2Fe_{14}B$, $SmCo_5$ and $Sm_2Co_{17}$ are very brittle intrinsically with an intergranular (Nd—Fe—B) or intragranular (Sm—Co) type fracture mechanism. $Nd_2Fe_{14}B$, $SmCo_5$ and $Sm_2Co_{17}$ compounds have the low symmetry tetragonal, hexagonal and rhombhedral crystal structures, respectively, that have an insufficient number of independent slip systems. Therefore, these compounds have little or no plastic deformation taking place before their fracture even though they have relatively high strength.

The commercial Sm—Co and Nd—Fe—B sintered magnets are quite brittle and easily prone to chipping, cracking or fracture in the courses of magnet manufacture, machining, shipping, assembly, operation and applications. Machining techniques of these magnets are limited to grinding, lapping, and electric discharge machining (EDM). Even grinding and lapping these magnets to the required dimensions often results in chipping, cracking, and fracture, which leads to the production losses up to 30%. The brittleness and poor machinability of these magnets imposes serious limitations on the magnet shapes and uses available.

The improvement in the toughness of REPMs while maintaining their high magnetic performance would not only improve their manufacturing efficiency and machinability, reduce part failure rate and effectively use of expensive critical materials, but it would also greatly expand the market share for this class of permanent magnets, by offering opportunities for new applications, new shapes, and lower costs. Tougher REPMs could also make it possible for production of bulky magnets with even higher magnetic performance and larger dimensions via optimization of alloy composition and heat treatment process, such as, higher Fe concentration and faster quench rate to increase $B_r$ and $(BH)_{max}$ values for the Sm—Co magnets.

It has been known that there was no phase transformation toughening or rising crack-growth-resistance (R-curve) behavior present in bulk REPMs. For the sintered REPMs (with the same or similar morphology, grain size modal, density and critical flaw size), the flexural strength $\sigma_0$ is directly related to fracture toughness $K_{Ic}$ as proposed by the equation of $K_{Ic}=\sigma_0 Y\sqrt{a}$, where Y is a dimensionless constant, which depends on the stress mode, shape and dimensions of the material, and geometry and length of the crack; a is crack of length for a body containing a crack. In the other words, there is a linear correlation between $K_{Ic}$ and $\sigma_0$. Therefore, it is expected that improving the magnet's flexural strength indicates an improved fracture toughness, or vice versa.

Improving the mechanical properties (mainly fracture toughness and flexural strength) of REPMs is of a great scientific, technical and practical significance. The studies on Sm—Co and Nd—Fe—B permanent magnets have been focused on the magnetic properties for many years. The research on the mechanical properties, strengthening and toughening of these magnets has been limitedly reported. Previous reports showed a 100% improvement in fracture toughness, 69% improvement in impact toughness, and 16% improvement in flexural strength for sintered Nd—Fe—B magnets through adjusting alloy compositions by the addition of small amounts of Nd, Dy and Pr; Al, Co, Cu, Ga, Mn, Nb, Ti, V, Zr or other transition metals, and mixtures thereof, and thus, forming fine precipitates within the grains, reducing grain size, engineering grain boundaries and/or lattice distortion. However, the alloying processes can change the electronic, magnetic and strain energy states of the lattice, or form alternative phases with completely different properties, especially the addition of non-magnetic elements, and thus, the hard magnetic properties are usually degraded.

The traditional and widely used alloying method makes magnet development higher cost, processing technique more complicate, and more resource-dependent that is associated with progressive resource exhaustion, supply uncertainty or even unavailability of critical elements/materials. Moreover, alloyed materials with complicated compositions may become more difficult to recycle. Up to now, the great challenge on effectively resolving the brittleness problem of the REPMs still remains.

It is known that grain refinement can make conventional ductile metals several times stronger, but this comes at dramatic loss of ductility. Engineering heterogeneous microstructure of ductile metals and alloys with multiple length scales has been applied as a strategy to enhance the plasticity of nanostructured materials which otherwise lack extensive dislocation activity, and therefore low ductility. For example, heterogeneous lamella structure in Ti characterized with soft micrograined lamellae embedded in hard ultrafine-grained lamella matrix and gradient structures in Cu and steel with spatial gradients in grain size from nanoscale to microscale typically from the surface to the central bulk produced an unprecedented mechanical property combination: as strong as ultrafine-grained metal and at the same time as ductile as conventional coarse-grained metal. Similarly, The formation of so called bi-modal microstructures (e.g., consisting of a mixture of ultrafine and micro-grains) with optimized and balanced combinations of strength and ductility in Cu were also reported.

SUMMARY OF THE INVENTION

The present invention involves engineering the feedstock particle sizes and/or magnet grain sizes and subsequent grain boundary structure with a fixed chemical composition to substantially tune certain mechanical properties of the REPMs while maintaining their high magnetic performance. The formation of such heterogeneous microstructures, such as bi-modal, tri-modal, or multi-modal grain size structures, laminated, gridded, or gradient coarse/fine grain structures, or other microstructural heterogeneity and configurations, without changing the chemical compositions of magnets, is also effective to increase toughness, as evidenced by an increased mechanical toughness property such as flexural strength and/or fracture toughness, of the REPMs. For the REPMs, heterogeneous structures and configurations with the combination of particle sizes or grain sizes ranging from nanometer, submicron (i.e. less than 1 micron) to several or tens of microns can have higher strength, while comparable ductility or brittleness compared with the microparticle structure in the commercial REPMs that have a single-modal coarse size of several or tens of micron made from commercial jet-milled precursors. The finer grains in the bi-modal, tri-modal, laminated, gridded, or gradient coarse/fine grain size structures and the subsequent grain boundary engineering improve especially flexural strength and fracture toughness of the REPMs. On the other hand, the coarser grains of the microstructure have more anti-oxidation ability and the formation of stronger texture in the sintered magnets, which can result in little or no change to the hard magnetic properties.

Pursuant to certain embodiments of the invention, the feedstock with different particle sizes and/or grain sizes is used to produce the sintered REPMs with heterogeneous grain structures, such as bi-modal, tri-modal, multi-modal, laminated, gridded, or gradient coarse/fine grain structures. In the meantime, the feedstock with different particle sizes can also effectively increase the density of the green compacts and further that of the sintered magnets for the sintered REPMs than the commercial feedstock that have a single-modal micron grain size.

Practically speaking, the feedstock with a bimodal or multimodal particle or grain sizes with average sizes in submicron scale and micron scale, respectively, are preferred. Both Sm—Co and Nd—Fe—B submicron and micron particles have good magnetic properties and better alignment in the magnetic field and have better resistance to oxidization during production handling compared with the nanoparticles though nanoparticles are expecting to have even higher strength and toughness.

Embodiments of the present invention thus relate to particle feedstock and heterogeneous microstructure for rare earth permanent magnets (REPMs) and their production methods. More particularly, the invention relates to feedstock and heterogeneous microstructure for REPMs with significantly enhanced toughness, while maintaining or with a minimum sacrifice in the hard magnetic properties. The novel tough REPMs have heterogeneous grain structures, such as bi-modal, tri-modal, multi-modal, laminated, gridded, or gradient coarse/fine grain structures, or other microstructural heterogeneity, etc., without changing the chemical compositions of magnets. To increase flexural strength (a mechanical toughness property) of the REPMs, only particle sizes or grain sizes of feedstock are modified with fixed chemical compositions, rather than the conventional materials-alloying method by changing chemical compositions and further magnet microstructure. For purposes of illustration and not limitation, the typical feedstock comprises 1-99 wt. %, such as for example 5-95 wt. %, modified finer (average particle size from submicron to about 1.5 micron) Sm—Co or Nd—Fe—B particle powders made from the commercial jet-milled Sm—Co or Nd—Fe—B micropar-ticle powders and 99-1 wt. %, such as for example 95-5 wt. %, commercial jet-milled Sm—Co or Nd—Fe—B microparticle powders (average particle size about 2-10 microns). Therefore, this invention is advantageous in that it can be easily integrated with the current industry production line for sintered REPMs. The novel REPMs with heterogeneous structures and fixed chemical compositions can maintain the hard magnetic properties, can be less dependent on the critical element resources, and can facilitate separation, sorting and recycling at the end of life.

Practice of the present invention thereby provides rare earth permanent magnets comprising a microstructure having a heterogeneous grain structure that improves a mechanical toughness property of the magnet with no or little reduction in magnetic properties of the magnet. The REPMs made pursuant to embodiments of the invention can have a variety of heterogeneous microstructures that include, but are not limited to, bi-modal, tri-modal, multi-modal, laminated, gridded, gradient grain structures, or other microstructural heterogeneity and configurations, without changing the chemical compositions of magnets. Certain particular embodiments of the present invention provide rare earth magnets having a multi-modal (e.g. bi-modal, tri-modal, etc.) grain microstructure wherein a plurality of localized grain regions (grain clusters) having a relatively smaller average grain size are disposed in and surrounded by a matrix having relatively larger average grain sizes.

In one illustrative embodiment, using the feedstock developed in this invention, the flexural strength values of sintered $Sm_2Co_{17}$ type $Sm_2(CoFeCuZr)_{17}$ magnets made using 20 wt. %, 30 wt. % and 40 wt. % cryomilled fine powders and balance jet milled powders as feedstocks were enhanced by 50% or greater; for example, by 50% (175 MPa), 58% (185 MPa) and 73% (202 MPa), respectively, relative to a flexural strength value of 117 MPa for the commercial magnet. Excellent magnetic properties were maintained with the maximum energy product $(BH)_{max}$ decreased (about 24 MGOe) by only 7.7% (less than 8%), respectively, and almost no decrease of remanence $B_r$ values. That is, practice of the present invention achieved significant enhancement of mechanical toughness properties, such as flexural strength, with no or little degradation of the hard magnetic properties; e.g. $(BH)_{max}$ and $B_r$, such as less than 10% degradation of $(BH)_{max}$ and $B_r$ at room temperature (20° C.).

In another embodiment of the invention, using the feedstock developed in this invention, the flexural strength values of sintered $SmCo_5$ type magnets made using 20 wt. % and 30 wt. % cryomilled fine powders and balance jet milled powders as feedstocks, respectively, were enhanced by 37% (214 MPa) and 21% (189 MPa) relative to a flexural strength value of 156 MPa for the commercial magnet. The values of both $B_r$ and $(BH)_{max}$ of the magnets made with the modified microstructures pursuant to the invention were even higher than those of the commercial counterpart magnet. That is, $(BH)_{max}$ increased by 10.5% and 15.8%, $B_r$ increased by 6.9% and 8.0% for these two magnets made pursuant to the invention, respectively.

In the embodiments just discussed, the Sm—Co bulk sintered magnets have a heterogeneous bi-modal grain microstructure without changing the chemical compositions of magnets. Other heterogeneous grain structures, such as tri-modal grain structure, multi-modal grain structure, fine laminated grain/coarse grain structure, gridded fine/coarse grain structure (i.e. square honeycomb fine/coarse grain structure), gradient grain structures, (such as having larger grains progressing to smaller grains from one side to another side across the microstructure, or having larger grains progressing to smaller grains that reside in the central areas and then progressing to larger grains, from one side to another side across the microstructure, or verse versa), or other microstructural heterogeneity and configurations, can also be produced in the REPMs using the feedstock and production process thereof developed in this invention. On the other hand, the heterogeneous structures can also be introduced into the REPMs by other fabrication methods including, but not limited to, friction consolidation extrusion, 3D printing, surface mechanical attrition treatment (SMAT), equal channel angular extrusion (ECAE), hot accumulative roll bonding (ARB), hot asymmetric rolling, high pressure torsion (HPT), hot drawing, mechanical milling, etc.

Figure 10:
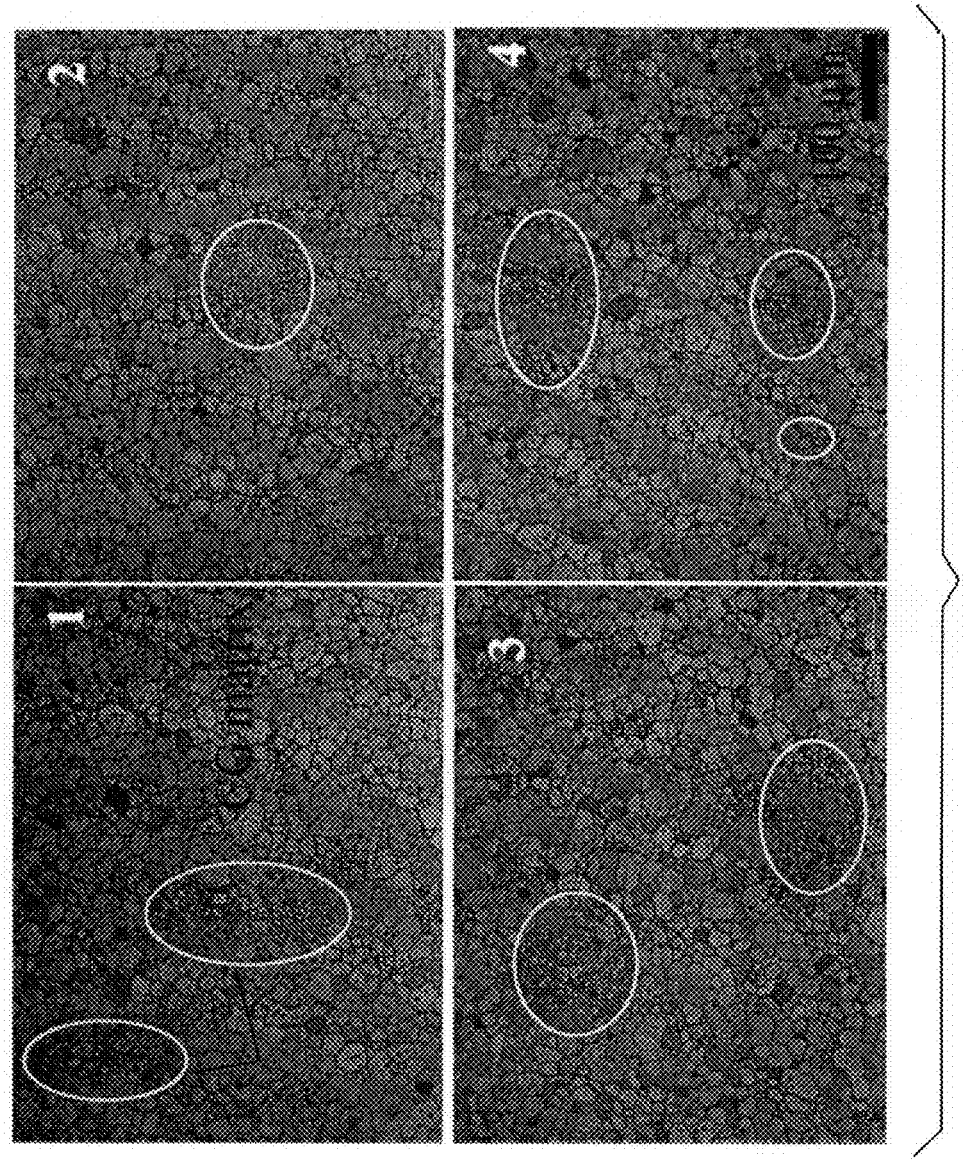
FIG. 10 shows optical photomicrographs (500×) of cross-section microstructure from selected areas 1, 2, 3 and 4 as shown in FIG. 9, for the 2:17 type $Sm_2(CoFeCuZr)_{17}$ sintered magnets made from the feedstock of 70 wt. % 2:17 type jet milled (JM) powders+30 wt. % 2:17 type cryomilled in liquid nitrogen (CM) powders. A typical bio-modal grain size structure was observed in the sintered magnet. The fine grains (FG) formed cluster areas (marked by white ovals) those uniformly distributed within the coarse grain (CG) matrix.
Figure 11:
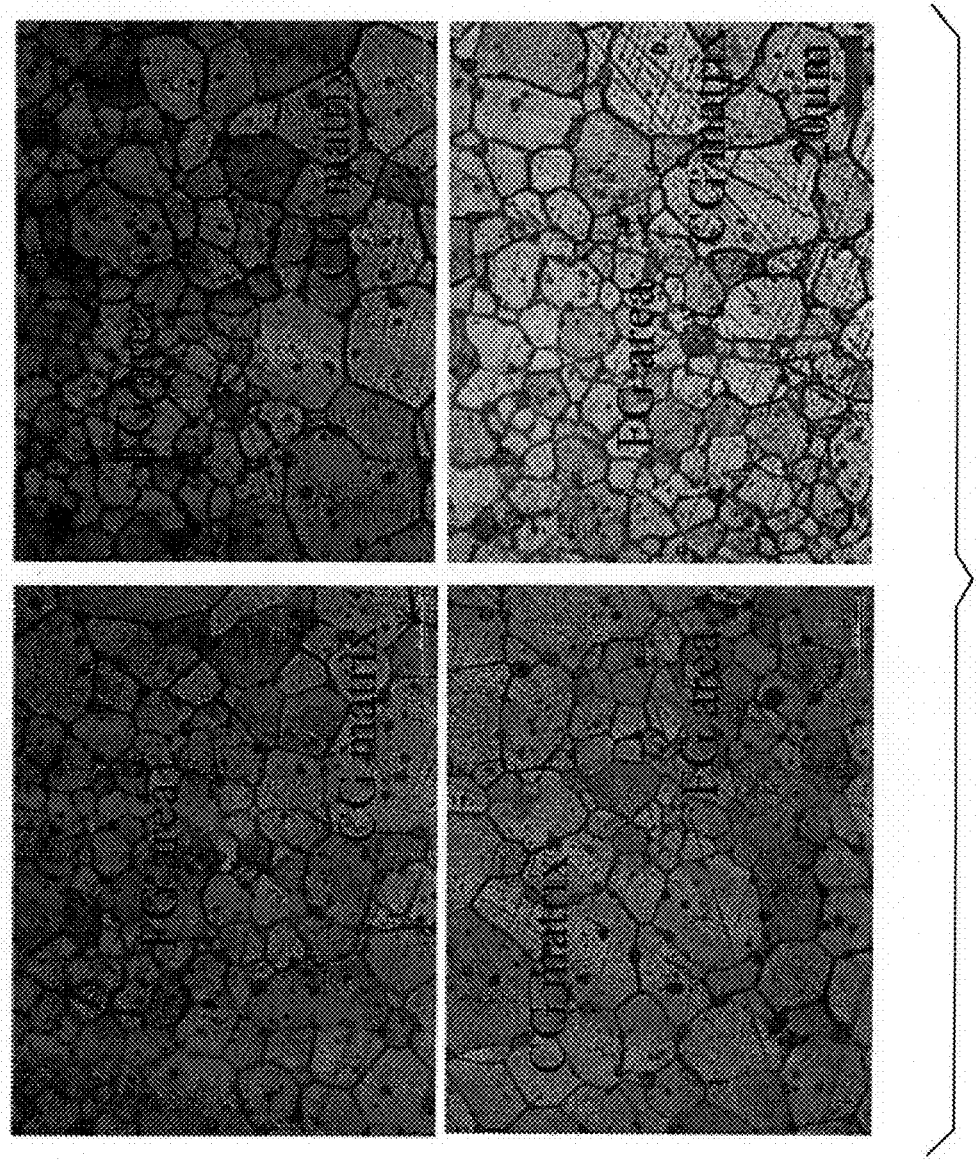

FIG. 11 shows optical photomicrographs (1000×) of the cross-section microstructure from selected areas for the 2:17 type $Sm_2(CoFeCuZr)_{17}$ sintered magnets made from the feedstock of 70 wt. % 2:17 type jet milled (JM) powders+30 wt. % 2:17 type cryomilled in liquid nitrogen (CM) powders. A typical bio-modal grain size structure was observed in the sintered magnet. The fine grains (FG) formed cluster areas (marked by white ovals) in FIG. 10 and uniformly distributed within the coarse grain (CG) matrix.

Figure 12A:
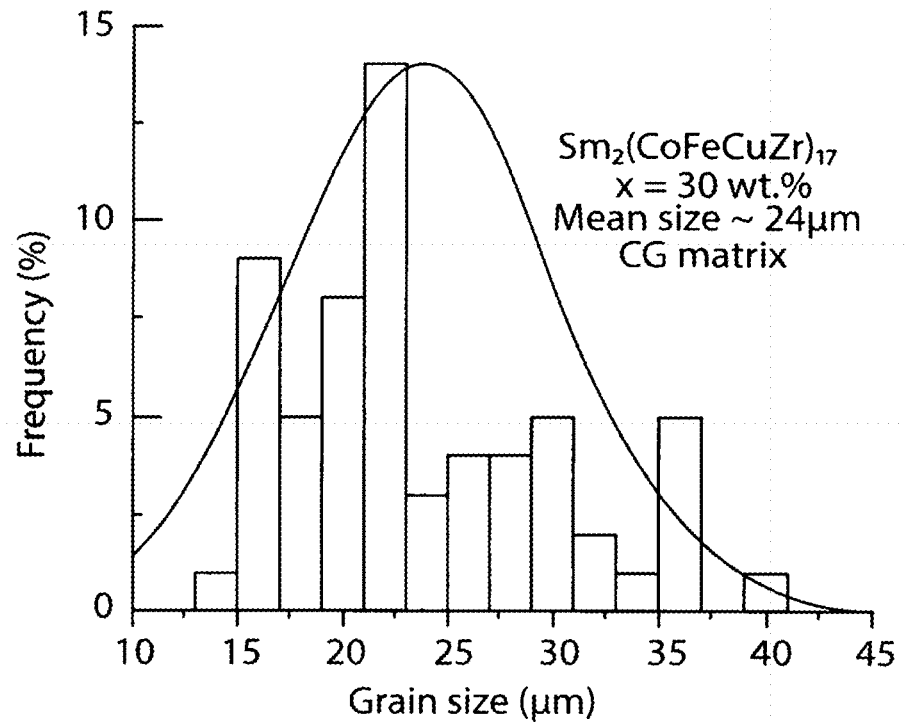
Figure 12B:
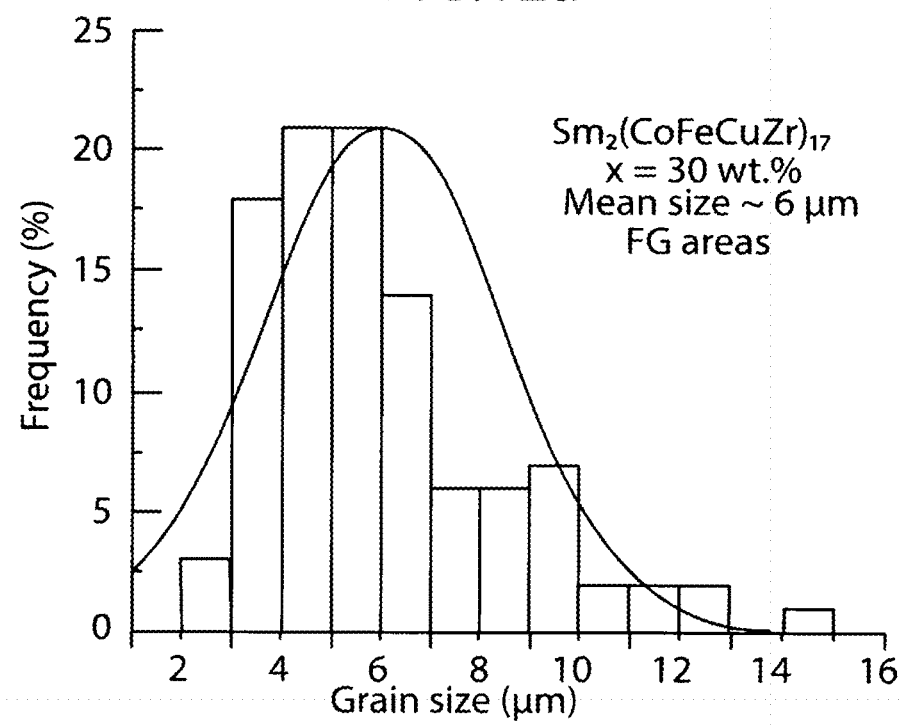

FIGS. 12a and 12b show grain size distribution of fine grain areas (FG areas, Fi. 12b) and coarse grain matrix (CG areas, FIG. 12a) of 2:17 type $Sm_2(CoFeCuZr)_{17}$ sintered magnets made from the feedstock of 70 wt. % jet milled (JM) powders+30 wt. % cryomilled in liquid nitrogen (CM) powders. The average (or mean) grain sizes were about 24 μm and 6 μm for the FG areas and CG matrix, respectively. These results were obtained from the optical images analyzed by the image J software.

Figure 13:
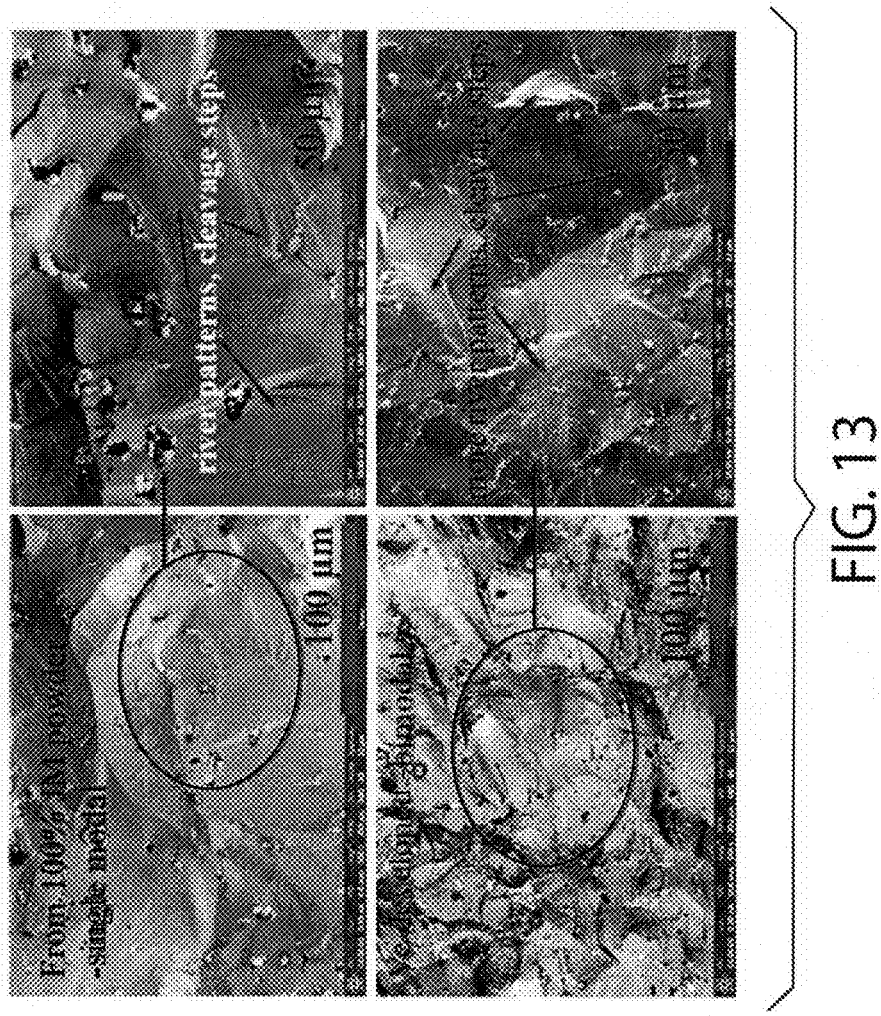

FIG. 13 shows scanning electron microscope (SEM) images of the fracture surface of $Sm_2(CoFeCuZr)_{17}$ type sintered magnets made from raw materials of (100-x) wt. % 2:17 type jet milled powders+x wt. % 2:17 type cryomilled powders. Right column shows the enlarged images from the selected areas (marked by the black-line ovals). Top images: x=0 wt. % sample, a single-modal coarse grain size (about 40 μm) microstructure; and Bottom images: x=30 wt. % sample having a 3D gradient harmonic microstructure with a bi-modal grain size distribution. A higher density while smaller size of river patterns and cleavage steps were observed in the heterogeneous magnets (bottom) with a bi-modal grain size distribution compared with the x=0 wt. % sample with a single-modal coarse grain size (top).

Figure 14:
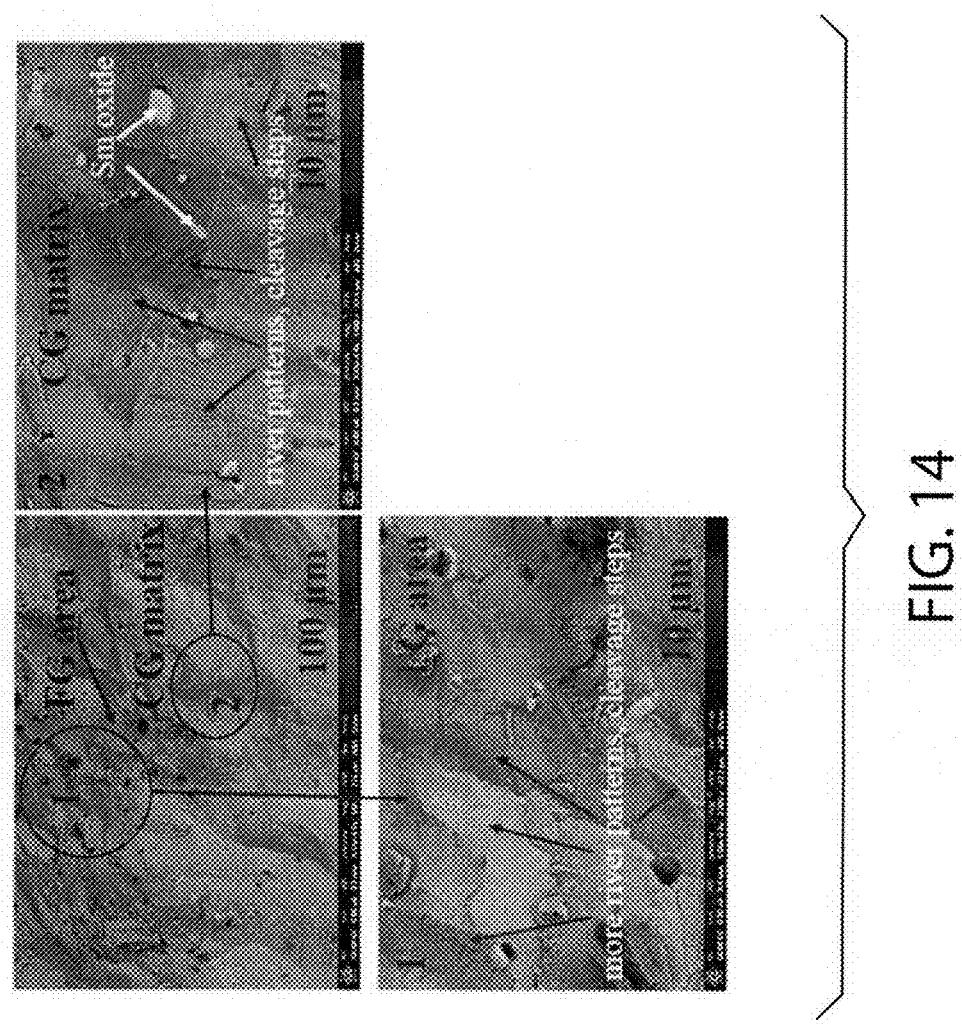

FIG. 14 shows SEM images of the fracture surface of $Sm_2(CoFeCuZr)_{17}$ type sintered magnets made from raw materials of 70 wt. % jet milled powders+30 wt. % cryomilled powders. Bottom-left and top-right images are the enlarged images from the selected areas: area 1—fine grain (FG) area, and area 2—coarse grain (CG) matrix (marked by the black-line ovals). A higher density while smaller size of river patterns and cleavage steps were observed in the heterogeneous magnets, especially in the finer grain cluster regions on the fracture surface.

Table 1 lists the flexural strength of sintered 2:17 type and 1:5 type Sm—Co magnets made from feedstock of (100-x) wt. % 2:17 or 1:5 type jet milled (JM) powders+x wt. % 2:17 or 1:5 type cryomilled in liquid nitrogen (CM) powders, x=0, 10, 15, 20, 25, 30, 40, according to the embodiment of the invention.

Table 2 lists magnetic properties and density of sintered 2:17 type and 1:5 type Sm—Co magnets made from feedstock of (100-x) wt. % 2:17 or 1:5 type jet milled (JM) powders+x wt. % 2:17 or 1:5 type cryomilled in liquid nitrogen (CM) powders, x=0, 10, 15, 20, 25, 30, 40. Remanence—$B_r$, intrinsic coercivity—$H_{ci}$, maximum energy product—$(BH)_{max}$, value of $H_c$ at $0.9B_r$—$H_k$, coercivity—$H_c$, magnet density—$\rho$.

Table 3 lists mean grain sizes of the fine grain (FG) areas and the coarse grain (CG) matrix, and overall mean gain sizes of both for the 2:17 type $Sm_2(CoFeCuZr)_{17}$ sintered magnets made from the feedstock of (100-x) wt. % jet milled (JM) powders+x wt. % (x=0, 10, 15, 20, 30, 40 wt. %) cryomilled (CM) powders.

DETAILED DESCRIPTION OF THE INVENTION

The present invention relates to rare earth permanent magnets (REPMs) having a heterogeneous microstructure and their production in a manner to provide significantly enhanced toughness; i.e. resistance-to-fracture as evidenced by enhanced mechanical toughness property such as flexural strength and/or fracture toughness, while maintaining or with a minimum sacrifice in the hard magnetic properties. The REPMs made pursuant to embodiments of the invention have heterogeneous grain microstructures, such as bi-modal, tri-modal, multi-modal, laminated, gridded, or gradient coarse/fine grain structures, or other microstructural heterogeneity, etc., without the need for changing the chemical compositions of magnets. To increase flexural strength and/or fracture toughness of the REPMs, particle sizes or grain sizes of the particle feedstock are modified with fixed chemical feedstock compositions in this invention. For purposes of illustration and not limitation the typical feedstock comprises 1-99 wt. % modified finer (average particle size from less than 1 micron; i.e. submicron to about 1.5 micron) Sm—Co or Nd—Fe—B particle powders made from the commercial jet-milled Sm—Co or Nd—Fe—B microparticle powders and 99-1 wt. % commercial jet-milled Sm—Co or Nd—Fe—B microparticle powders (average particle size about 2-10 micron) where the terms average and mean are used interchangeably (synonymously) herein with respect to values of particle sizes and grain sizes. As a result, practice of the invention can be easily integrated with the current industry production line for sintered REPMs. In certain embodiments, the powders can be mixed together under argon or other non-reactive atmosphere in a mixer or mill for greater than 0 to 100 hours or more as needed. The powders can be formed into a green compact and consolidated by techniques that include, but are not limited to, powder metallurgy processing, hot pressing, friction consolidation extrusion, 3D printing, surface mechanical attrition treatment (SMAT), equal channel angular extrusion (ECAE), hot accumulative roll bonding (ARB), hot asymmetric rolling, high pressure torsion (HPT), hot drawing, and mechanical milling. The REPMs with heterogeneous microstructures and fixed chemical compositions pursuant to embodiments of the invention can maintain the hard magnetic properties without substantial degradation of the hard magnetic properties such as $BH_{max}$ and $B_r$, can be less dependent on the critical element resources, and can facilitate separation, sorting and recycling at the end of life.

Figure 1:
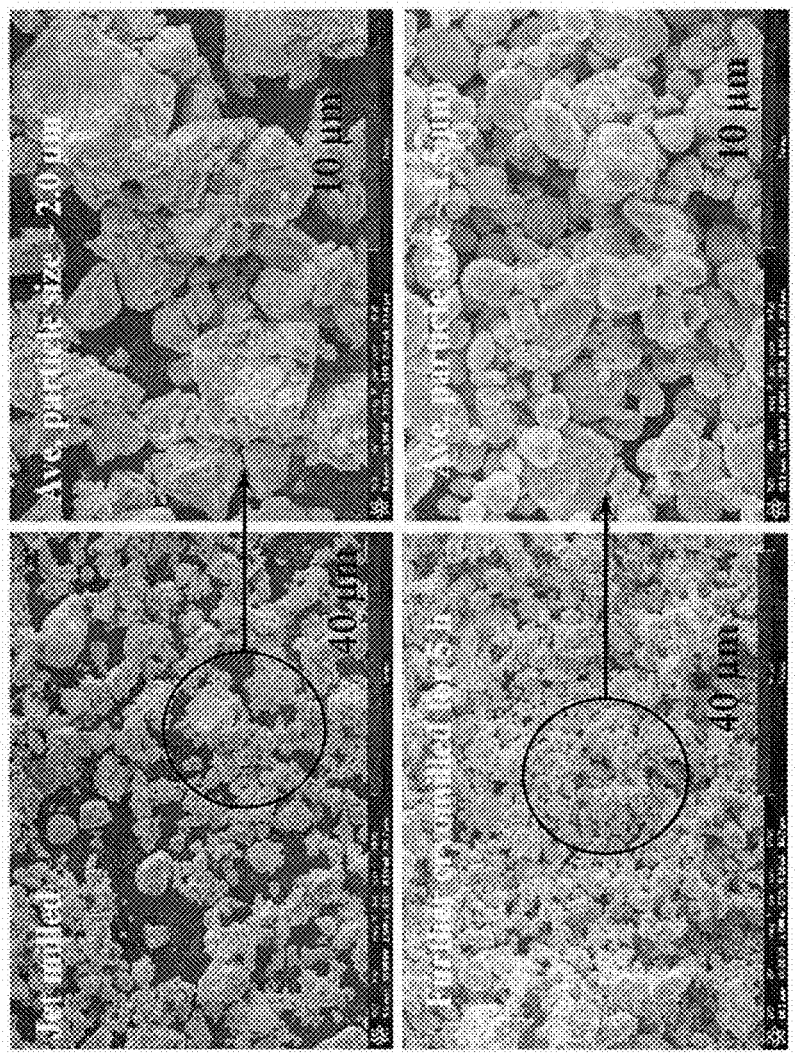
FIG. 1 shows morphology (SEM images) of $SmCo_5$ powders (1500×) (Jet milled powders shown in top row) and further cryomilled in $LN_2$ (liquid nitrogen) for 5 hrs (shown in bottom row), according to one embodiment of the invention. The right column is the corresponding enlarged images (5000×).
Figure 2:
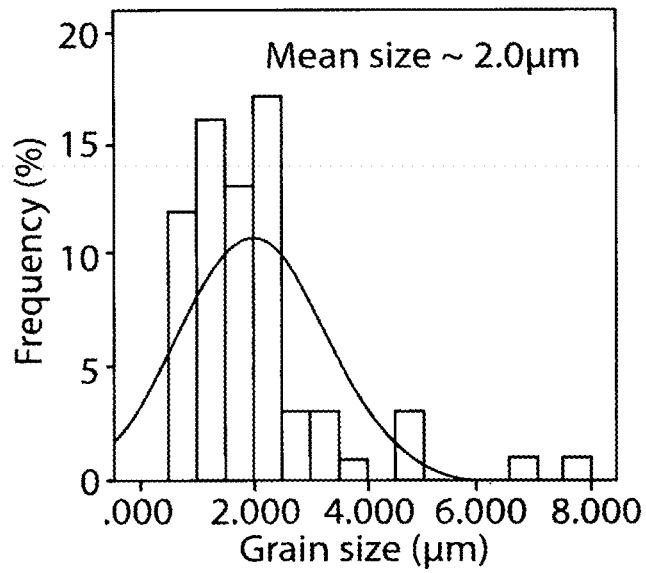
FIG. 2 shows grain size distribution of the $SmCo_5$ powders (Jet milled powders (shown in top graph) and further cryomilled in $LN_2$ for 5 hr (shown bottom graph) with average (mean) sizes of about 1.5 µm and 2.0 µm, respectively, where the terms average and mean are used interchangeably (synonymously) herein with respect to values of particle sizes and grain sizes. These results were obtained from the SEM images analyzed by the image J software.
Figure 2:
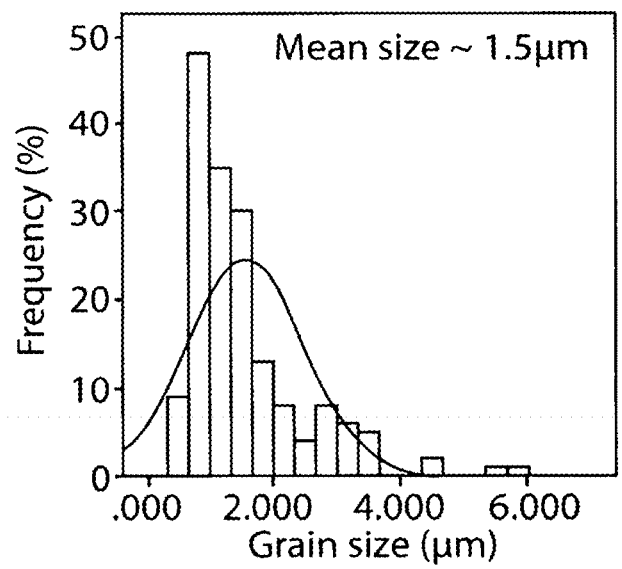

The following examples are offered for purposes of further illustration, but not limitation, with respect to the present invention:

Fine Sm—Co (both 2:17 and 1:5 types) powders (average particle size about 1 μm) were synthesized by cryomilling in liquid nitrogen ($LN_2$), using commercial jet milled microparticle powders as the precursors and a SPEX 6875D Freezer/Mill. FIGS. 1 and 2 show typical morphology and grain size distribution of jet milled $SmCo_5$ powders with/without (w/o) further ball milling in $LN_2$ for 5 hrs. The jet milled precursor powders were mainly composed of particles with a size of about 1.0-2.5 μm with an average (mean) particle size of about 2.0 μm. The particle size range was within about 0.7-8.0 μm. With increasing the cryomilling time from 1 hr to 5 hrs, the average particle size continuously decreased. The Sm—Co powders after cryomilled for 5 hrs were mainly composed of particles with a size of about 1.0 μm or less, which had average (mean) particle size of about 1.5 μm. The particle size range was within about 0.5-6.0 μm. Similar results were obtained for the 2:17 type $Sm_2(CoFeCuZr)_{17}$ jet milled and cryomilled powders. The jet milled $Sm_2(CoFeCuZr)_{17}$ powders were composed of irregular microparticles with a particle size mainly in the range of about 0.7-3.0 μm and average (mean) particle size of 2.3 μm. The overall particle size range of the jet milled powders was within about 0.7-8.0 μm. Whereas, the $Sm_2(CoFeCuZr)_{17}$ powders further cryomilled for 2 hrs were composed of finer irregular microparticles with a particle size mainly in the range of about 0.5-1.5 μm and average (mean) particle size of 1.3 μm and less-sharp edges. The overall particle size range of the cryomilled powders was within about 0.5-8.0 μm. Both the conventional jet milled microparticles and the further cryomilled finer particles had a single-crystal structure. These particle size results were obtained from the SEM images analyzed by image J software. Both the cryomilled finer particles and the commercial jet milled microparticles were mainly single-crystal structure. Besides cryomilling in liquid nitrogen, the other finer powder preparation methods wherein the particle size ranging from nanometer, submicron, and micron scale or their mixtures, that is smaller than that of jet-milled powders with a typical average particle size of about 2-5 micron, include but are not limited to, some top-down and bottom-up approaches, such as, multiple jet milling, low or high energy ball milling at room temperature in inert gas (Ar, $N_2$, or He) or in solvent media (ethanol, hexane, heptane, toluene, etc.), organic surfactant-assisted high energy ball milling at room temperature, inert gas atomization, gas condensation, spark erosion, chemical precipitation, sol-gel, pyrolysis and hydrothermal synthesis, plasma arcing, chemical vapor deposition (CVD), physical vapor deposition (PVD), electrodeposition, atomic layer deposition (ALD), etc.

The cryomilled Sm—Co sub-micron powders produced pursuant to embodiments of this invention were then mixed with the jet milled precursor powders under an argon atmosphere in a SPEX 8000M Mixer/Mill without any milling balls for a time of 2 or 3 minutes, which more generally can be up to 15 minutes or more or other suitable blending time. The particle mixture then is subjected to conventional powder metallurgy method (i.e. sintering a pressed compact) to produce a bulk magnet with grain boundary engineering or modified microstructure. The particular illustrative powder metallurgy steps typically include cold compaction of the magnetically aligned powder mixture to form a green compact and then sintering the green compact, although the powders can be formed into a green compact and consolidated by techniques that include, but are not limited to, powder metallurgy processing, hot pressing, friction consolidation extrusion, 3D printing, surface mechanical attrition treatment (SMAT), equal channel angular extrusion (ECAE), hot accumulative roll bonding (ARB), hot asymmetric rolling, high pressure torsion (HPT), hot drawing, and mechanical milling. The powder metallurgy method optionally can include preparation of ingot chips by strip casting or bulk ingot by induction melting or arc melting, hydrogen decrepitation or crushing into coarse powders of about 100 micron or less sizes, jet milling or ball milling into fine microparticles of the average particle sizes described above, magnetically aligning by a 4 or 7 Tesla pulsed magnetic field and pre-pressing powder mixtures into green compacts by a pressure of 35,000 psi (about 241 MPa) using a Nikisso CL15-45-30 iso-static press, and subsequent heat treatment procedure, including sintering, solution, temper, and aging.

In the examples below, the green compacts were pre-pressed by a pressure of 241 MPa using the above Nikisso CL15-45-30 iso-static press and sintered. The 2:17 type $Sm_2(CoFeCuZr)_{17}$ were sintered at 1190-1220° C. for 1-2 hrs, solution tempered at 1150-1185° C. for 1-7 hrs, and aged at 800-850° C. for 5-10 hrs then cooling to 400° C. at a ramp rate of 0.7-1.0° C./min., further aging at 400° C. for 1-10 hrs. Sintered 1:5 type $SmCo_5$ were sintered at 1130-1150° C. for 1-2 hrs, solution tempered at 850-900° C. for 5-7 hrs, and then quenched in argon.

Figure 3:
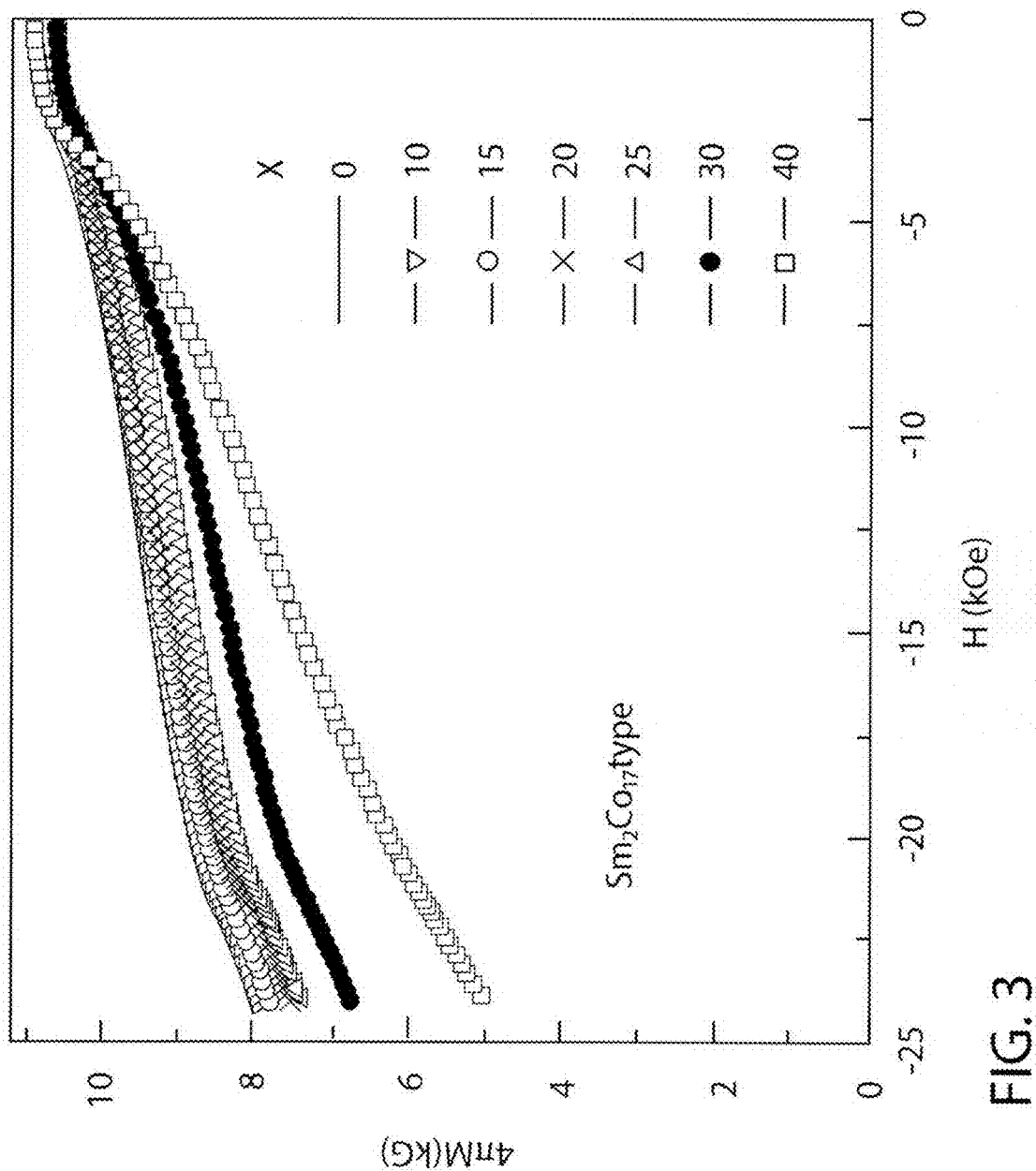
FIG. 3 presents demagnetization curves of 2:17 type $Sm_2(CoFeCuZr)_{17}$ sintered magnets made from feedstock of (100-x) wt. % 2:17 type jet milled (JM) powders+x wt. % 2:17 type cryomilled in liquid nitrogen (CM) powders, x=0, 10, 15, 20, 25, 30, 40, according to an embodiment of the process of the invention.

Sintered 2:17 type $Sm_2(CoFeCuZr)_{17}$ magnet density p was 8.4 g/cc, which was about 99% of theoretical value. Demagnetization curves and magnetic properties are shown in FIG. 3 and Table 2 for the sintered 2:17 type magnets made from feedstock of (100-x) wt. % 2:17 type jet milled (JM) powders+x wt. % 2:17 type cryomilled in liquid nitrogen (CM) powders. The remanence $B_r$ was about 10.6 kGs, and intrinsic coercivity $H_{ci}$ was higher than 24 kOe for all the 2:17 type magnets. Maximum energy product $(BH)_{max}$ was about 26 MGOe for x=0 sample while its value decreased a little with increasing of x values.

Table 1 below lists the flexural strength of sintered 2:17 type and 1:5 type Sm—Co magnets made from feedstock of (100-x) wt. % 2:17 or 1:5 type jet milled (JM) powders+x wt. % 2:17 or 1:5 type cryomilled in liquid nitrogen (CM) powders. By engineering the grain size and grain-boundary microstructure, the flexural strength of the sintered $Sm_2Co_{17}$ type magnets were enhanced by 50%, 58%, and 73% (175 MPa, 185 MPa and 202 MPa for the samples with x=20, 30, and 40, respectively) compared to 117 MPa for the sample with x=0. A flexural strength value of 120 MPa for the sample with x=0 was reported for a commercial $Sm_2Co_{17}$ type magnets (http://www.electronenergy.com/products/materials). Excellent magnetic properties were maintained with the maximum energy product $(BH)_{max}$ (about 24 MGOe) decreased by only 7.7% (less than 8%), respectively, and almost no decrease of remanence $B_r$ values. Flexural strengths reported above were measured using the 3-point bending ASTM flexure test no. C1161-13. Fracture toughness, another mechanical toughness property, can be measured by the Charpy V-notch or IZOD ASTM tests no. C1421-16.

Figure 4:
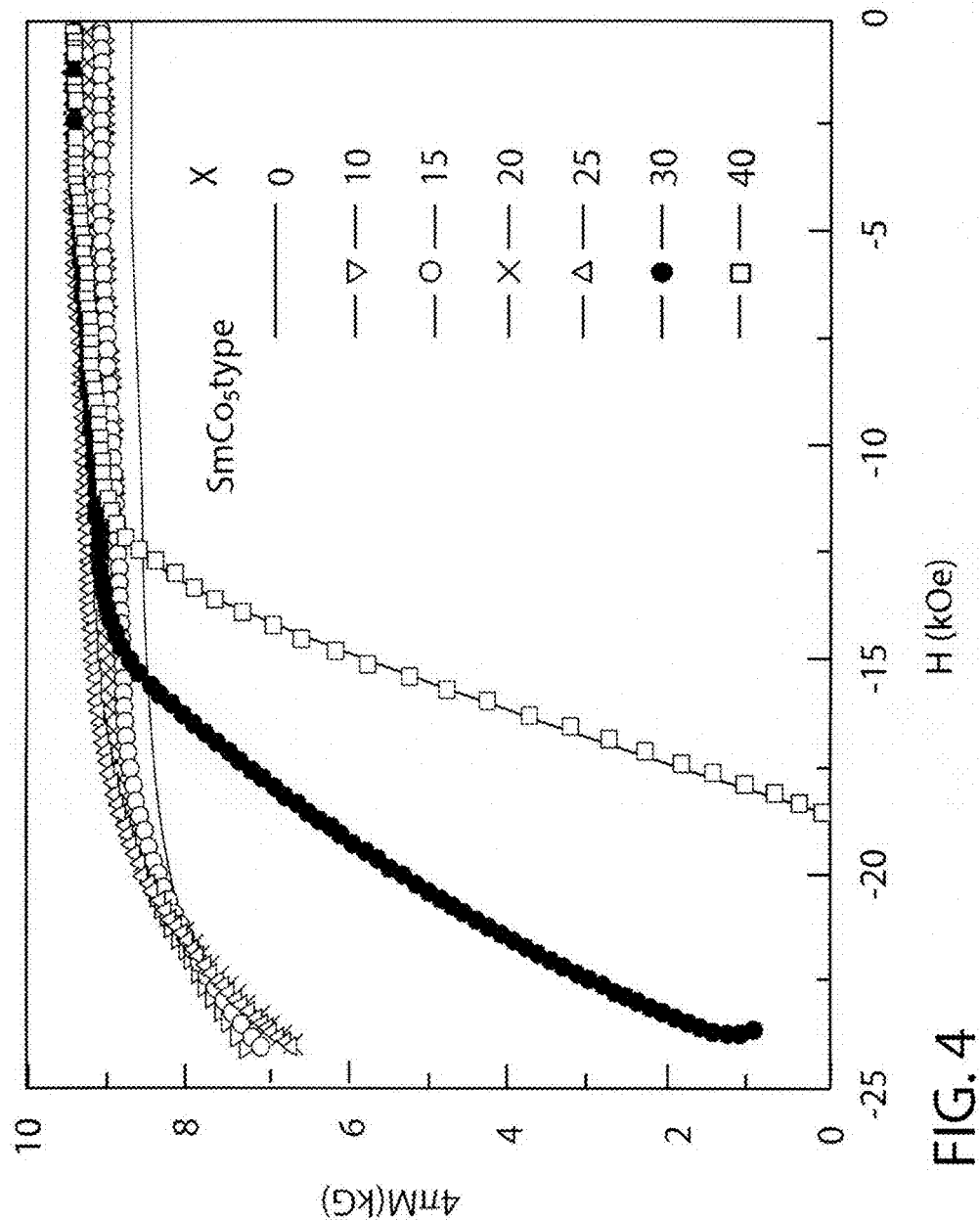
FIG. 4 illustrates demagnetization curves of 1:5 type Sm—Co sintered magnets made from feedstock of (100-x) wt. % 1:5 type jet milled (JM) Sm—Co powders+x wt. % 1:5 type cryomilled in liquid nitrogen (CM) powders, x=0, 10, 15, 20, 25, 30, 40, in accordance with an embodiment of the process of the invention.

FIG. 4 and Table 2 below show demagnetization curves and magnetic properties of the sintered 1:5 type $SmCo_5$ magnets made from feedstock of (100-x) wt. % 1:5 type jet milled (JM) powders+x wt. % 1:5 type cryomilled in liquid nitrogen (CM) powders. By engineering the grain size and grain-boundary microstructure, the flexural strength of new sintered $SmCo_5$ type magnets were enhanced by 37% and 21%, which was 214 MPa and 189 MPa for the samples with x=20 and 30, respectively, compared to a flexural strength value of 156 MPa for the sample with x=0. A flexural strength value of 130 MPa was reported for commercial $SmCo_5$ magnets (http://www.electronenergy.com/products/materials). The higher flexural strength value of 156 MPa for the present sample with x=0 than that of the reported commercial magnet was likely due to the variable particles sizes of feedstocks and thus grain sizes of the sintered magnets. The values of both remanence $B_r$ and the maximum energy product $(BH)_{max}$ of the samples with modified microstructures pursuant to the invention were even higher than those of the commercial counterpart x=0 sample. That is, $(BH)_{max}$ (about 21 and 22 MGOe) increased by 10.5% and 15.8%, $B_r$ (about 9.3 and 9.4 KG) increased by 6.9% and 8.0% for the samples with x=20 and 30, respectively.

Figure 5:
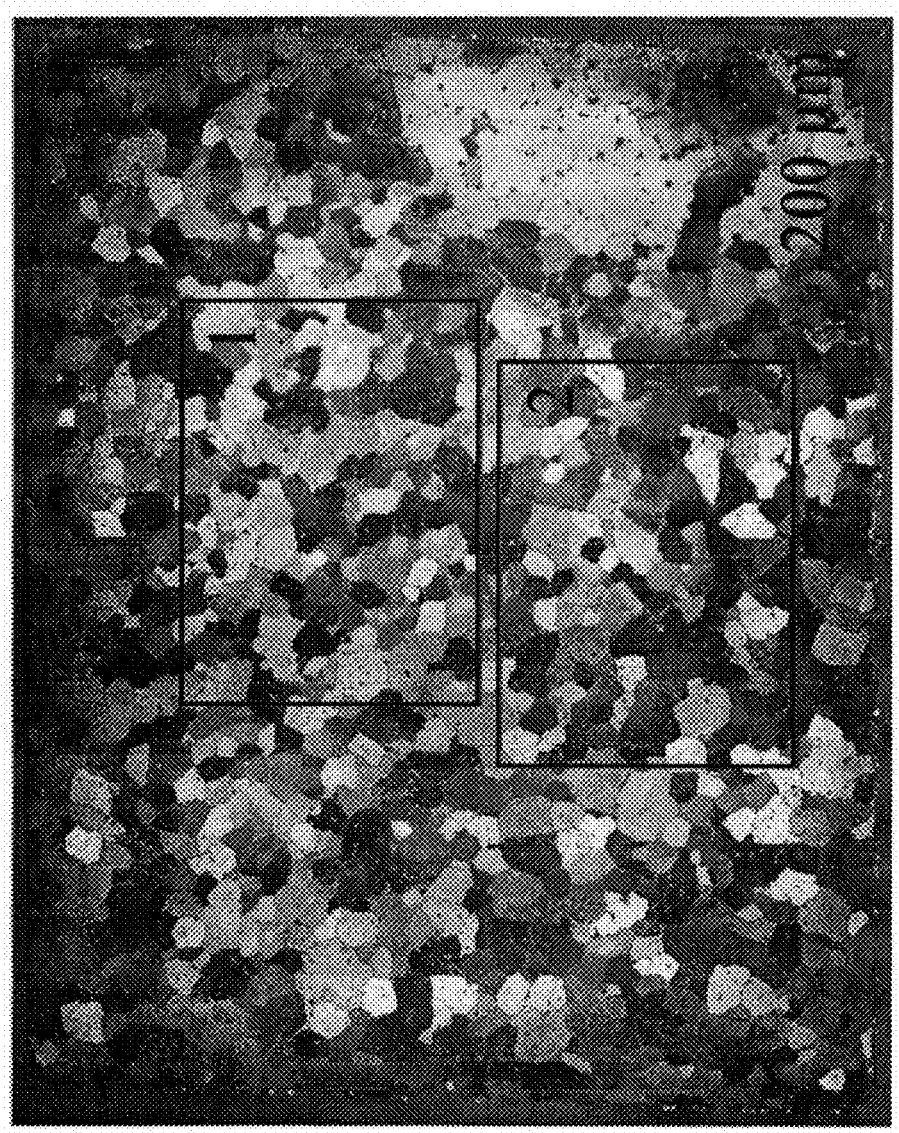
FIG. 5 shows an optical photomicrograph (200×) of cross-section microstructure of the 2:17 type $Sm_2(CoFeCuZr)_{17}$ sintered magnets made from 100 wt. % 2:17 type jet milled (JM) powders. Typical single-modal grain size structure was observed. The specimen was mechanically polished then etched with 2% nital etchant for the metallographic examination.
Figure 6:
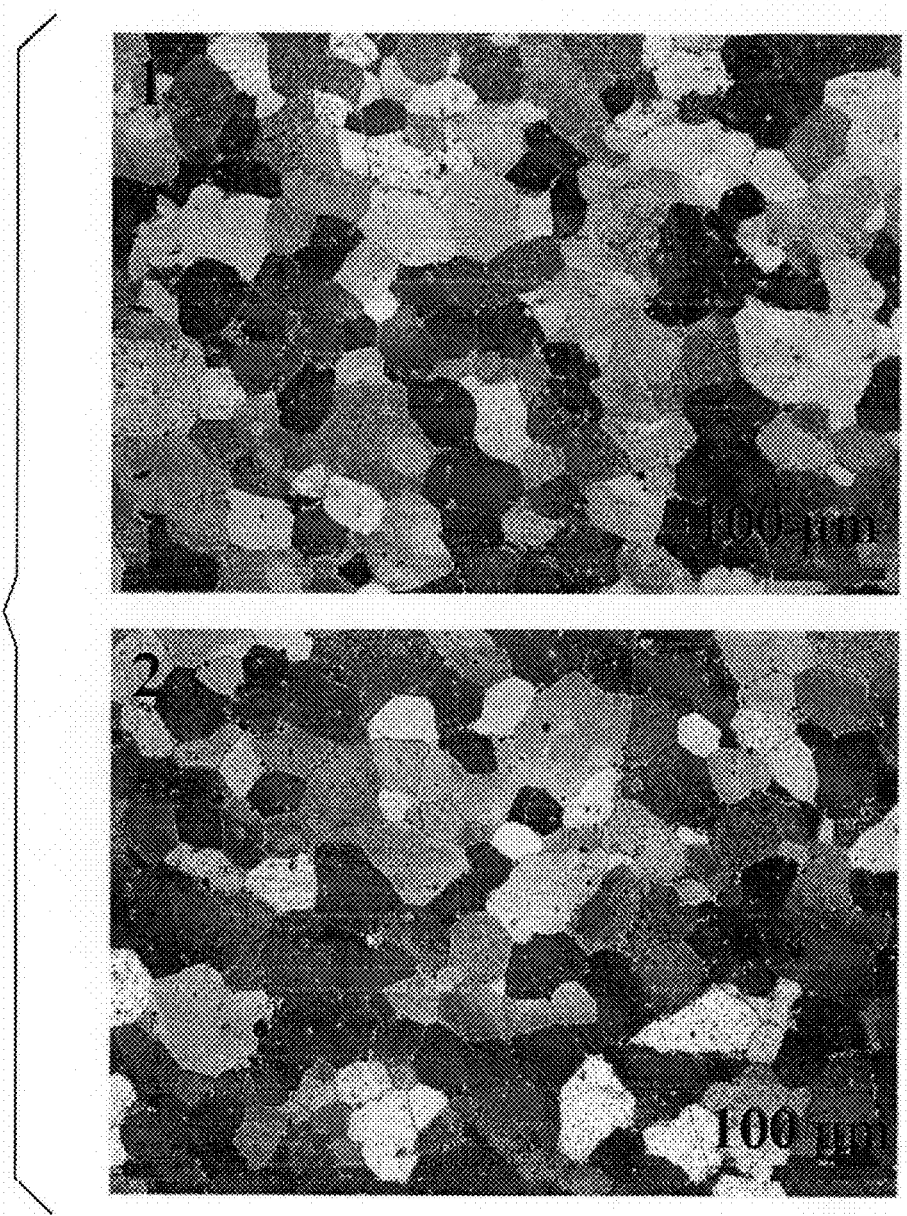
FIG. 6 shows optical photomicrographs (500×) of cross-section microstructure from selected areas 1 and 2 as shown in FIG. 5, for the 2:17 type $Sm_2(CoFeCuZr)_{17}$ sintered magnets made from 100 wt. % 2:17 type jet milled (JM) powders. Typical single-modal grain size structure was observed.
Figure 7:
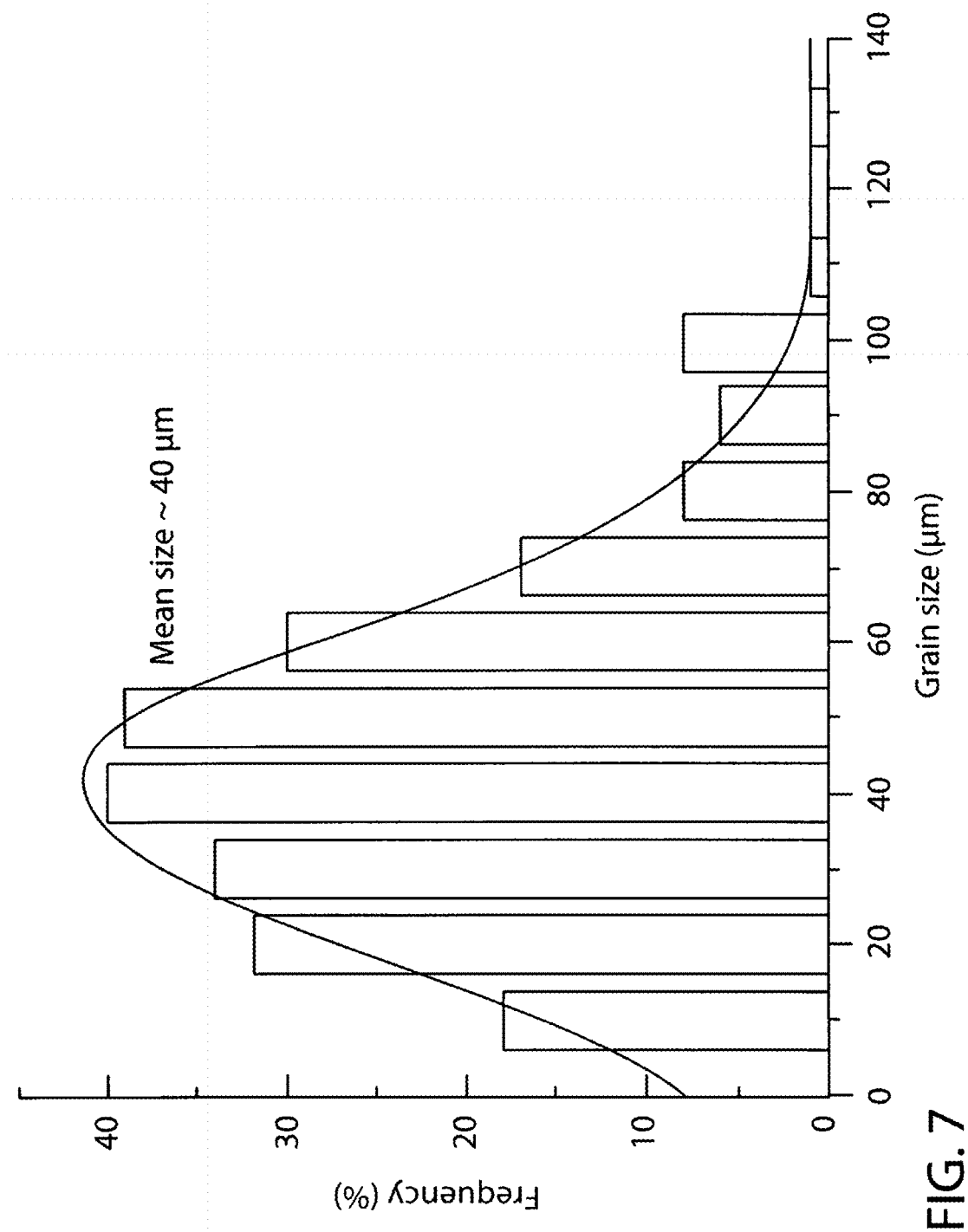
FIG. 7 shows grain size distribution of the 2:17 type $Sm_2(CoFeCuZr)_{17}$ sintered magnets made from 100 wt. % 2:17 type jet milled (JM) powders. Typical single-modal grain size structure was observed with an average grain size of about 40 µm.
Figure 8:
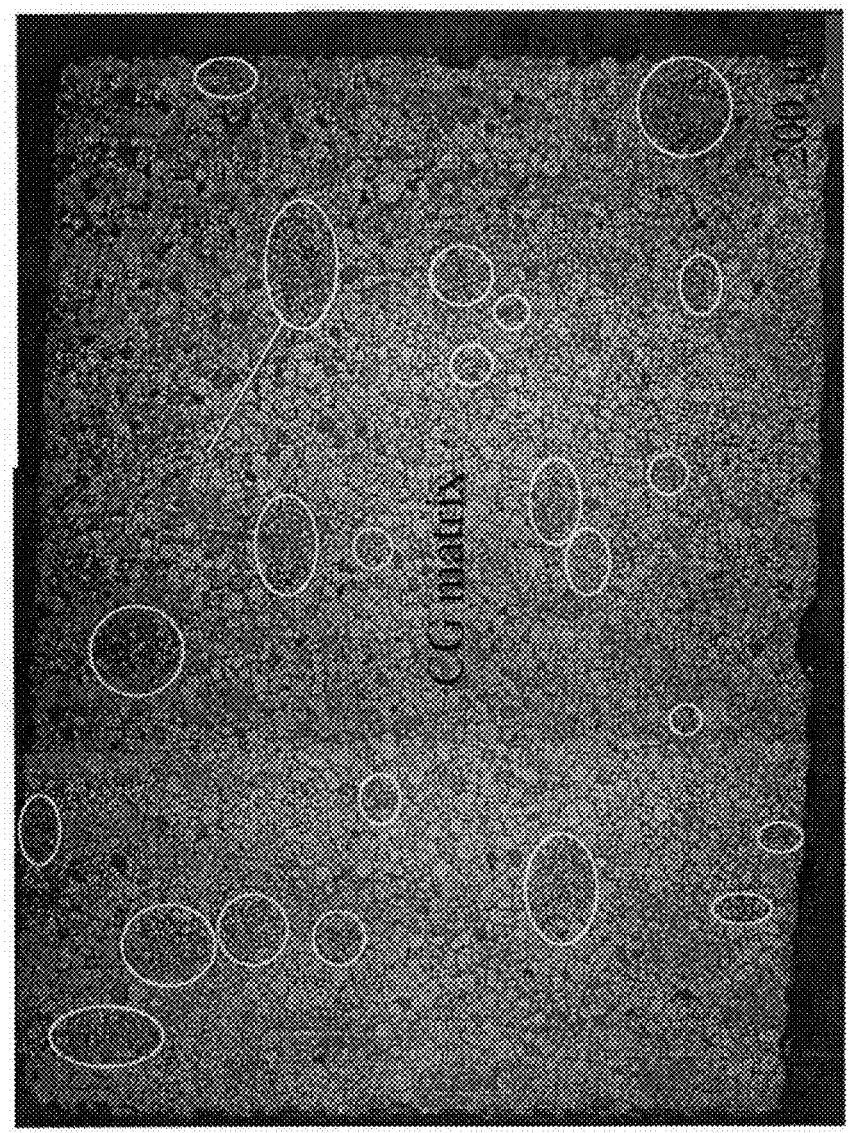
FIG. 8 shows optical photomicrograph (200×) of cross-section microstructure of the 2:17 type $Sm_2(CoFeCuZr)_{17}$ sintered magnets made from the feedstock of 70 wt. % 2:17 type jet milled (JM) powders+30 wt. % 2:17 type cryomilled in liquid nitrogen (CM) powders. The specimen was mechanically polished then etched with 2% nital etchant for the metallographic examination. A typical bio-modal grain size structure was observed in the sintered magnet. The fine grains (FG) formed cluster areas (marked by white ovals) those uniformly distributed within the coarse grain (CG) matrix. The Sm—Co sintered magnet with a 3D gradient harmonic structure of controlled bimodal grain size distribution exhibited considerably higher flexural strength and comparable magnetic properties, compared with the magnet with a single-modal grained structure as shown in FIGS. 5-7.
Figure 9:
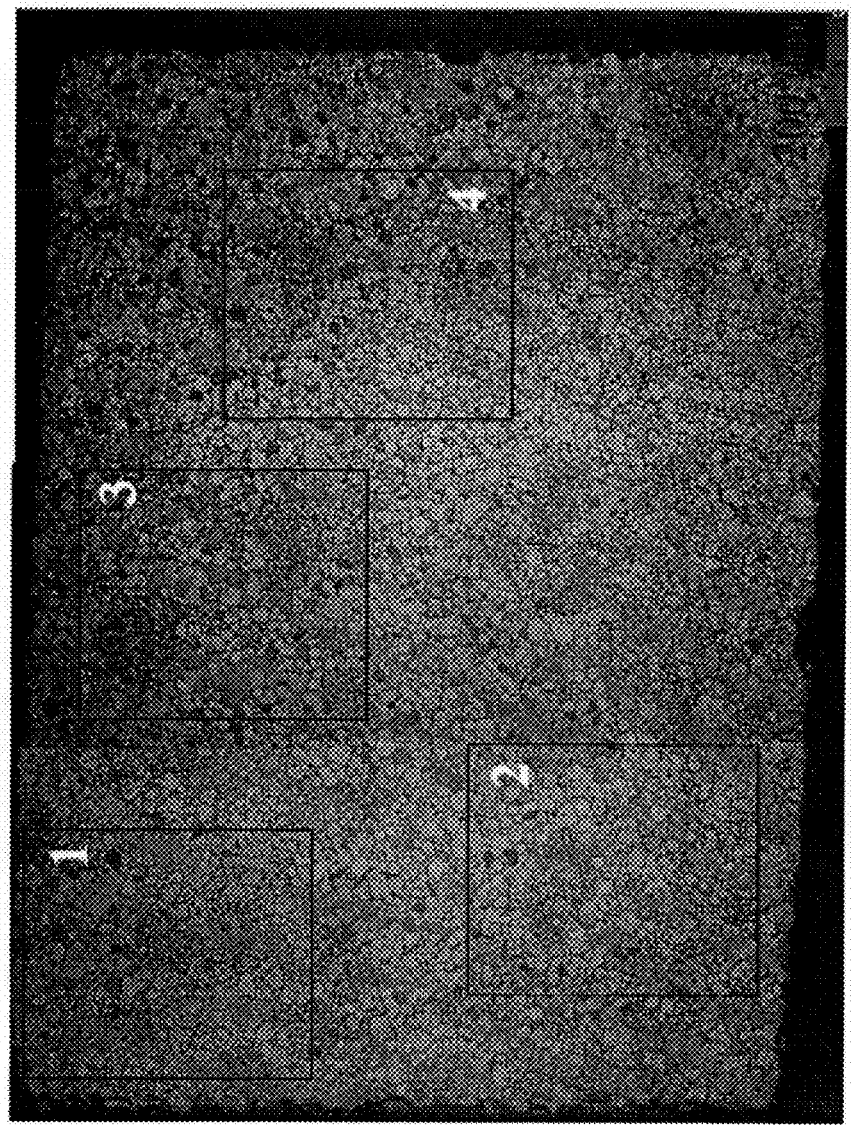
FIG. 9 shows optical photomicrograph (200×) of cross-section microstructure of the 2:17 type $Sm_2(CoFeCuZr)_{17}$ sintered magnets made from the feedstock of 70 wt. % 2:17 type jet milled (JM) powders+30 wt. % 2:17 type cryomilled in liquid nitrogen (CM) powders. The areas 1, 2, 3 and 4 marked by squares were selected for further enlarged observation.

With respect to sintered microstructures, a typical single-modal grain size structure with average (mean) grain size of about 40 µm was observed in the 2:17 type $Sm_2(CoFeCuZr)_{17}$ sintered magnets made from 100 wt. % 2:17 type jet milled (JM) powders, as shown in FIGS. 5-7. In contrast, the Sm—Co bulk magnets made from the feedstock mixtures pursuant to the invention have a bi-modal grain size microstructure, as shown in the typical FIGS. 8-12a, 12b. The fine grains (FG) formed cluster areas (localized regions) and uniformly distributed within the coarse grain (CG) matrix. FIGS. 12a, 12b show grain size distribution of fine grain areas (FG) and coarse grain (CG) matrix of 2:17 type $Sm_2(CoFeCuZr)_{17}$ sintered magnets made from the feedstock of 70 wt. % jet milled (JM) powders+30 wt. % cryomilled in liquid nitrogen (CM) powders. The average (mean) sizes were about 6 µm and 24 µm for the FG areas and CG matrix, respectively. The sizes of the respective FG localized areas were in the range of about 60-190 µm. The other Sm—Co sintered magnets developed by practice of embodiments of the present invention showed similar heterogeneous microstructure with a bi-modal grain size distribution. Table 3 lists mean grain sizes of the fine grain (FG) areas and the coarse grain (CG) matrix, and overall mean gain sizes for the 2:17 type $Sm_2(CoFeCuZr)_{17}$ sintered magnets made from the feedstock of (100-x) wt. % jet milled (JM) powders+x wt. % (x=0, 10, 15, 20, 30, 40 wt. %) cryomilled (CM) powders. With increasing x values, the mean grain sizes of both FG areas and CG matrix, and overall mean gain sizes decreased monotonously. These results were obtained from the optical images analyzed by image J software. This novel 3D gradient harmonic microstructure with a bi-modal grain size resulted in considerably higher flexural strength and higher fracture toughness, and comparable magnetic properties, compared with the magnet with a single-modal grain sized microstructure as shown in FIGS. 5-7.

The enhancement of flexural strength of Sm—Co sintered magnets resulted from the grain size refinement with the contributions from both localized fine grain cluster regions and a general grain size reduction from the coarse grain matrix, i.e. bimodal grain size engineering. The localized fine grain clusters are more effective in preventing crack nucleation or propagation via acting as strengthening sites and therefore they have higher flexural strength. Since it is known that the sintered Sm—Co magnets have a brittle intragranular cleavage fracture mechanism under normal stress, the characteristic morphology of cleavage fracture, such as river patterns and cleavage steps, was observed on the fracture surface of the $Sm_2(CoFeCuZr)_{17}$ type sintered magnets as shown in FIGS. 13 and 14. No section shrink, fiber region, or shear lip was observed on the fracture surface. A higher density while smaller size of river patterns and cleavage steps were observed in the fine grain clusters on the fracture cross-section surface as shown in FIGS. 13 and 14, which increased the energy needed for nucleation or propagation of the main crack. This is a structure proof of the strengthening effect from the fine grain clusters.

The magnets developed pursuant to embodiments of the invention can be expected to find similar applications in various industries as those of commercial sintered or die-upset REPMS. Applications include, but are not limited to, e.g., telecommunication, magnetic storage, biomedical equipment, consumer electronics, sensors, power and propulsion applications such as high performance motors and generators and ion engines, inertial devices such as gyroscopes and accelerometers, and traveling wave tubes, and many more.

Tables 1, 2 and 3 appear below:

TABLE 1

Flexural strength of sintered 2:17 type and 1:5 type Sm—Co magnets made from feedstock of (100 − x) wt. % 2:17 or 1:5 type jet milled (JM) powders + x wt. % 2:17 or 1:5 type cryomilled in liquid nitrogen (CM) powders, x = 0, 10, 15, 20, 25, 30, 40.

| Samples | CM/JM weight ratio x/(100 − x) | Flexural strength (MPa) | STD | Increase by (%) |
|---|---|---|---|---|
| $SmCo_5$ | 0/100 | 156 (130*) | 14 | — |
|  | 10/90 | 183 | 6 | 17 |
|  | 15/85 | 176 | 4 | 13 |
|  | 20/80 | 214 | 2 | 37 |
|  | 25/75 | 201 | 9 | 29 |
|  | 30/70 | 189 | 14 | 21 |
|  | 40/60 | 182 | 5 | 17 |
| $Sm_2(CoFeCuZr)_{17}$ | 0/100 | 117 (120*) | 3 | — |
|  | 10/90 | 159 | 10 | 36 |
|  | 15/85 | 161 | 17 | 38 |
|  | 20/80 | 175 | 20 | 50 |
|  | 30/70 | 185 | 25 | 58 |
|  | 40/60 | 202 | 10 | 73 |

Note:
Values marked as * were from the commercial Sm—Co magnets (http://www.electronenergy.com/products/materials).

TABLE 2

Magnetic properties and density of sintered 2:17 type and 1:5 type Sm—Co magnets made from feedstock of (100 − x) wt. % 2:17 or 1:5 type jet milled (JM) powders + x wt. % 2:17 or 1:5 type cryomilled in liquid nitrogen (CM) powders, x = 0, 10, 15, 20, 25, 30, 40. Remanence-$B_r$, intrinsic coercivity-$H_{ci}$, maximum energy product-$(BH)_{max}$, value of $H_c$ at $0.9B_r$-$H_k$, coercivity-$H_c$, density-$\rho$.

| Samples | x/(100 − x) ratio | $B_r$ (kG) | $H_{ci}$ (kOe) | $(BH)_{max}$ (MGOe) | $H_k$ (kOe) | $H_c$ (kOe) | $\rho$ (g/cc) |
|---|---|---|---|---|---|---|---|
| $SmCo_5$ | 0/100 | 8.7 | >24 | 19 | 22.0 | 8.6 | 8.1 |
|  | 10/90 | 9.1 | >24 | 21 | 21.3 | 9.0 | 8.4 |
|  | 15/85 | 9.1 | >23 | 21 | 20.9 | 9.0 | 8.3 |
|  | 20/80 | 9.3 | >23 | 21 | 20.7 | 9.1 | 8.3 |
|  | 25/75 | 9.4 | >23 | 22 | 20.2 | 9.3 | 8.5 |
|  | 30/70 | 9.4 | >23 | 22 | 15.5 | 9.2 | 8.5 |
|  | 40/60 | 9.4 | 18.7 | 22 | 12.6 | 9.1 | 8.5 |

TABLE 2-continued

Magnetic properties and density of sintered 2:17 type and 1:5 type Sm—Co magnets made from feedstock of (100 − x) wt. % 2:17 or 1:5 type jet milled (JM) powders + x wt. % 2:17 or 1:5 type cryomilled in liquid nitrogen (CM) powders, x = 0, 10, 15, 20, 25, 30, 40. Remanence-$B_r$, intrinsic coercivity-$H_{ci}$, maximum energy product-$(BH)_{max}$, value of $H_c$ at $0.9B_r$-$H_k$, coercivity-$H_c$, density-$\rho$.

| Samples | x/(100 − x) ratio | $B_r$ (kG) | $H_{ci}$ (kOe) | $(BH)_{max}$ (MGOe) | $H_k$ (kOe) | $H_c$ (kOe) | $\rho$ (g/cc) |
|---|---|---|---|---|---|---|---|
| Sm$_2$(CoFeCuZr)$_{17}$ | 0/100 | 10.6 | >24 | 26 | 12.0 | 9.8 | 8.4 |
| | 10/90 | 10.6 | >24 | 26 | 11.5 | 9.7 | 8.4 |
| | 15/85 | 10.6 | >24 | 26 | 10.1 | 9.6 | 8.4 |
| | 20/80 | 10.6 | >24 | 26 | 8.8 | 9.5 | 8.4 |
| | 25/75 | 10.6 | >24 | 25 | 7.6 | 9.3 | 8.4 |
| | 30/70 | 10.6 | >24 | 24 | 5.9 | 9.0 | 8.4 |
| | 40/60 | 10.9 | >23 | 24 | 4.2 | 8.7 | 8.4 |

TABLE 3

Mean grain sizes of the fine grain (FG) areas and the coarse grain (CG) matrix, and overall mean gain sizes for the 2:17 type Sm$_2$(CoFeCuZr)$_{17}$ sintered magnets made from the feedstock of (100 − x) wt. % jet milled (JM) powders + x wt. % (x = 0, 10, 15, 20, 30, 40 wt. %) cryomilled powders.

| Samples | CM/JM powder weight ratio x/(100 − x) % | Mean grain size from FG areas (μm) | Mean grain size from CG matrix (μm) | Overall mean grain size D (μm) |
|---|---|---|---|---|
| Sm$_2$(CoFeCuZr)17 | 0/100 | — | 40 | 40 |
| | 10/90 | 14 | 29 | 28 |
| | 15/85 | 12 | 26 | 24 |
| | 20/80 | 8 | 25 | 22 |
| | 30/70 | 6 | 24 | 19 |
| | 40/60 | 5 | 12 | 9 |

From Table 3, it is apparent that practice of embodiments of the invention can produce fine grain (FG) areas that have an average (mean) grain size in the range of about 5 to about 15 μm, while the associated CG matrix can have an average (mean) grain size in the range of about 10 to about 30 μm wherein the average grain size of the FG areas can be about 25% to about 50% of the average grain size of the CG matrix. Practice of the invention is not limited to the particular permanent magnet materials set forth above and can include, but is not limited to, samarium-cobalt type (SmCo$_5$ and Sm$_2$Co$_{17}$ types) magnets, neodymium-iron-boron type (Nd$_2$Fe$_{14}$B type) magnets, neodymium-iron-carbon type magnets (R$_2$Fe$_{14}$C type, R=rare earth, La or yttrium), R-iron-nitrogen type magnets (R$_2$Fe$_{17}$X$_\delta$ type, R=rare earth, La or Y; X=H, C, and/or N), or R-iron-M-nitrogen type magnets (R(Fe, M)$_{12}$X$_\delta$ type, R=rare earth, La or Y; M=Mo, V, Ti, Si, Al, Cr, Cu, Ga, Ge, Mn, Nb, Sn, Ta, W or Fe; X=H, C, and/or N). The permanent magnet materials also can comprise a stable or metastable rare-earth-transition metal based magnetic compound, having the formula of R$_2$TM$_{14}$A, RTM$_5$, RT$_2$M$_{17}$, R$_2$TM$_{17}$A, RTM$_7$, RTM$_7$A, RTM$_{12}$, RTM$_{12}$A, R$_3$TM$_{29}$, and R$_3$TM$_{29}$A, wherein R is one or a combination of rare earths, La or yttrium, TM is one or a mixture of transition metals, and A is one or a combination of the following elements: Be, B, C, N, S, Mg, Al, Si, P, Ga, Ge, As, Se, In, Sn, Sb, Te, I, Pb, and Bi.

References incorporated herein by reference:

E. P. Wohlfarth, K. H. J. Buschow, Ferromagnetic materials, North Holland, 1988.

http://www.electronenergy.com/products/materials.

J. F. Liu, P. Vora, M. H. Walmer, E. Kottcamp, S. A. Bauser, A. Higgins, and S. Liu, Journal of Applied Physics, 97 (2005) 10H101.

W. Li, A. H. Li, H. J. Wang, W. Pan, H. W. Chang, Journal of Applied Physics, 105 (2009) 07A703.

S. Q. Liu, J. F. Liu, US Patent Pub. No.: US 2005/0081960 A1

X. Y. Li, K. Lu, Nature Materials 16 (2017) 700.

X. L. Wu, M. X. Yang, F. P. Yuan, G. L. Wu, Y. J. Wei, X. X. Huang, and Y. T. Zhu, Proceedings of the National Academy of Sciences of the United States of America, 112 (2015) 14501.

X. L. Wu, P. Jiang, L. Chen, F. P. Yuan, and Y. T. Zhu, Proceedings of the National Academy of Sciences of the United States of America, 111 (2014) 7197.

Y. M. Wang, M. W. Chen, F. H. Zhou, E. Ma, Nature 419 (2002) 912.

P. F. Cesar, H. N. Yoshimura, W. G. Jr Miranda, C. L. Miyazaki, L. M. Muta, L. E. Rodrigues Filho, Journal of Biomedical Materials Research Part B Applied Biomaterials 78 (2006) 265.

While the exemplary embodiments of the present invention have been shown and described herein, it will be apparent to those skilled in the art that many changes and modifications may be made without departing from the invention in its true scope and broader aspects. The appended claims are therefore intended to cover all such changes and modifications as fall within the spirit and scope of the invention as set forth in the following claims.

What is claimed is:

1. A rare earth SmCo$_5$ permanent magnet comprised of binder-free consolidated and sintered powder particles and having a magnet composition and sintered microstructure characterized by a heterogeneous multi-modal grain structure that is present throughout the sintered microstructure without added grain boundary modifier composition different from the magnet composition wherein the multi-modal grain structure of the sintered microstructure includes at least two distinct grain regions having the same composition as the magnet composition but having at least one most coarse grain region having a plurality of relatively most coarse grains aggregated together with an average most coarse grain size of about 10 to about 30 microns and at least one fine grain region having a plurality of relatively fine grains aggregated together with an average fine grain size that is about 25% to about 50% of the average coarse grain size wherein the at least one fine grain region is present as a strengthening microstructural feature in the sintered microstructure with a periphery thereof forming a fine grain-tocoarse grain boundary with the at least one most coarse grain region and is present in controlled proportion of the sintered microstructure to increase a mechanical property comprising at least one of fracture toughness and mechanical strength of said magnet having the heterogeneous multi-modal grain structure as compared to a sintered magnet having said magnet composition but a single modal grain structure with a single average grain size of about 40 microns, without altering the magnet composition, wherein the $SmCo_5$ permanent magnet has a flexural strength of 182 to 214 MPa at 20° C.

2. The magnet of claim 1 wherein the heterogeneous grain structure comprises a bi-modal grain size distribution.

3. The magnet of claim 1 wherein the heterogeneous grain structure comprises a tri-modal or multi modal grain size distribution.

4. The magnet of claim 1 wherein the heterogeneous grain structure comprises a gradient distribution of grain sizes across the microstructure.

5. A rare earth permanent magnet comprised of binder-free consolidated and sintered powder particles and having a magnet composition and sintered microstructure characterized by a heterogeneous multi-modal grain structure that is present throughout the sintered microstructure without added grain boundary modifier composition different from the magnet composition wherein the multi-modal grain structure of the sintered microstructure includes at least two distinct grain regions having the same composition as the magnet composition but having at least one most coarse grain region having a plurality of relatively most coarse grains aggregated together with an average most coarse grain size of about 10 to about 30 microns and at least one fine grain region having a plurality of relatively fine grains aggregated together with an average fine grain size that is less than the average most coarse grain size wherein the at least one fine grain region has a periphery forming a fine grain-to-coarse grain boundary with the at least one most coarse grain region in the sintered microstructure and present in controlled proportion of the sintered microstructure to produce the permanent magnet, without altering the magnet composition wherein the multi-modal grain structure comprises laminated most coarse grain regions and fine grain regions in the sintered microstructure.

6. The magnet of claim 5 comprising a samarium-cobalt ($SmCo_5$ and $Sm_2Co_{17}$) magnet, a neodymium-iron-boron ($Nd_2Fe_{14}B$) magnet, a neodymium-iron-carbon magnet ($R_2Fe_{14}C$, R=rare earth, La or yttrium), a R-iron-nitrogen magnet ($R_2Fe_{17}X_8$, R=rare earth, La or Y; X=H, C, and/or N), or a R-iron-M-nitrogen magnet (R (Fe, M)$_{12}X_8$, R=rare earth, La or Y; M=Mo, V, Ti, Si, Al, Cr, Cu, Ga, Ge, Mn, Nb, Sn, Ta, W or Fe; X=H, C, and/or N).

7. A rare earth $Sm_2(CoFeCuZr)_{17}$ permanent magnet comprised of binder-free consolidated and sintered powder particles and having a magnet composition and sintered microstructure characterized by a heterogeneous multi-modal grain structure that is present throughout the sintered microstructure without added grain boundary modifier composition different from the magnet composition wherein the multi-modal grain structure of the sintered microstructure includes at least two distinct grain regions having the same composition as the magnet composition but having at least one most coarse grain region having a plurality of relatively most coarse grains aggregated together with an average most coarse grain size of about 10 to about 30 microns and at least one fine grain region having a plurality of relatively fine grains aggregated together with an average fine grain size that is about 25% to about 50% of the average coarse grain size wherein the at least one fine grain region is present as a strengthening microstructural feature in the sintered microstructure with a periphery thereof forming a fine grain-to-coarse grain boundary with the at least one most coarse grain region and is present in controlled proportion of the sintered microstructure to increase a mechanical property comprising at least one of fracture toughness and mechanical strength of said magnet having the heterogeneous multi-modal grain structure as compared to a sintered magnet having said magnet composition but a single modal grain structure with a single average grain size of about 40 microns, without altering the magnet composition, wherein the $Sm_2(CoFeCuZr)_{17}$ permanent magnet has a flexural strength of 159 to 202 MPa at 20° C.

* * * * *